March 19, 1957     E. GAIRING     2,785,456
LOCKING DEVICE FOR REMOVABLE CUTTER BLADES
Filed May 14, 1954
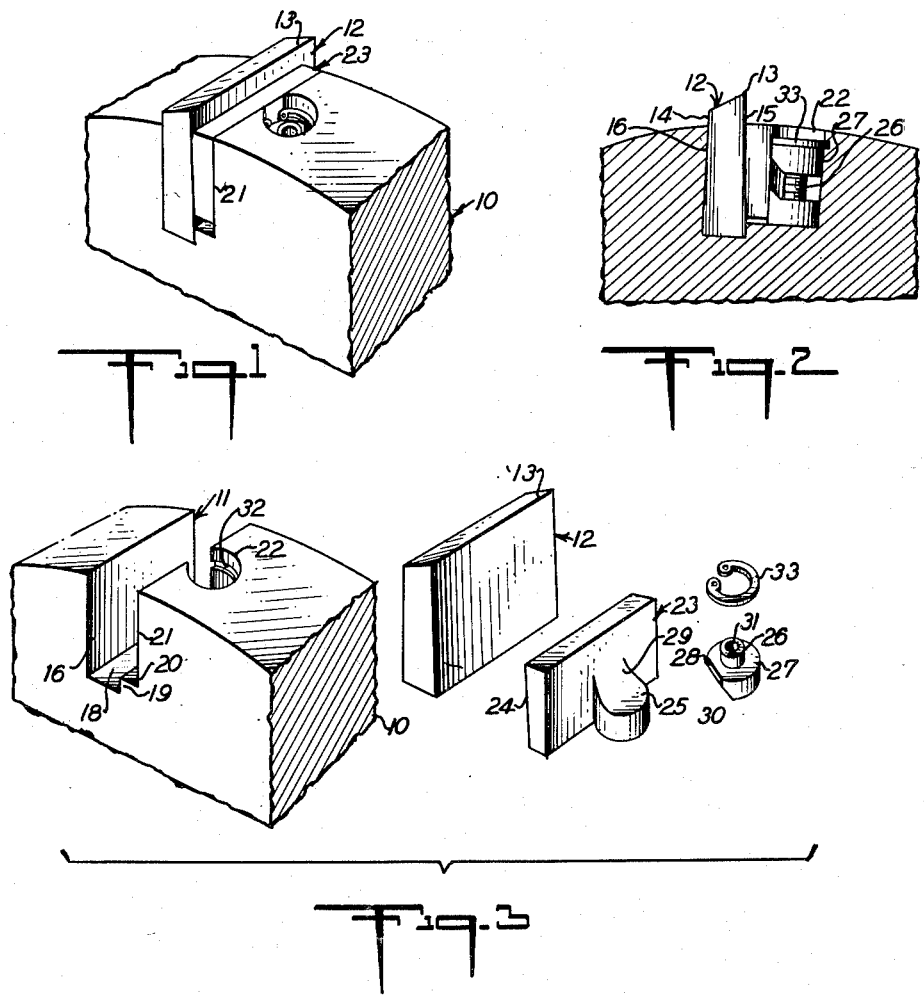
INVENTOR
*EMIL GAIRING*
BY
ATTORNEYS

United States Patent Office 2,785,456
Patented Mar. 19, 1957

2,785,456

LOCKING DEVICE FOR REMOVABLE CUTTER BLADES

Emil Gairing, Detroit, Mich.

Application May 14, 1954, Serial No. 429,767

3 Claims. (Cl. 29—105)

This invention relates to machine tools and more particularly to a locking device for securing cutter blades in place on milling cutters or the like and for facilitating removal of such cutter blades for sharpening or replacement.

Heretofore, numerous types of cutter blade locks have been proposed and utilized but many of these required drilling and threading of the cutter body and likewise many of these included removable parts which were likely to become lost or deformed in such a manner as to render the same inoperative and comparatively useless. Furthermore, many of these prior art devices did not firmly lock the removable blades in the cutter body, thus permitting movement thereof during cutting operations and destroying the accuracy of the apparatus. Likewise many of these prior art locking devices required numerous adjustments to bring the same into proper locking position thus materially increasing the time required for cutter replacement and thereby reducing the available production time of the machine in which the cutter was utilized.

It is accordingly an object of this invention to provide a locking device for securely locking in place removable cutter blades in a cutter body for use in milling machines and the like.

A further object of the invention is the provision of a locking device for securing removable cutter blades in place in a cutter body, which device requires only a simple operation with a conventional Allen wrench to release or clamp the cutter blade in place.

A further object of the invention is the provision of a locking device for removable cutter blades in a cutter body for use in milling machines or the like, which device requires no threaded openings in the cutter body which are subject to wear and consequently reduce the utility of the device.

A still further object of the invention is the provision of a locking device for removable cutter blades in a cutter body for use in milling machines or the like in which the locking device becomes an integral part of the cutter body and need not be removed therefrom upon removal of the cutter for sharpening or replacement.

Another object of the invention is the provision of a locking device for a removable cutter blade in the cutter body for use in milling machines or the like, which device serves to securely lock the blades in place in the same relative position and requiring no adjustment to maintain the accuracy of the apparatus.

A further object of the invention is the provision of a locking device for removable cutter blades in the body of a cutter for use in milling machines or the like, which device may be economically manufactured from readily available materials and which comprises a relatively small number of parts and a device which may be incorporated in the cutter body by relatively simple machining operations.

Further objects and advantages of the invention will be apparent from the following description taken in conjunction with the accompanying drawing wherein:

Fig. 1 is a view in perspective showing a portion of a cutter body and incorporating the locking device of this invention in place and securing a removable cutter blade in the body;

Fig. 2 a sectional view showing the structure of the cutter blade locking device of this invention and the manner of installation in the cutter body; and Fig. 3 an exploded perspective view showing the parts comprising the cutter blade locking device of this invention, as well as the cutter blade to be locked in place in the cutter body.

With continued reference to the drawing there is shown a portion of a cutter body 10 of the type commonly employed in milling machine cutters or the like, and this body 10 may be provided on the circumference thereof, with a plurality of spaced slots 11. Each slot 11 serves to receive a removable cutter blade 12 and as many slots 11 are provided in the body 10 as the desired number of cutter blades 12. The removable blade 12 may be provided with a cutting edge 13 which may be ground to any desired angle or shape depending upon the material or contour to be milled and the cutter blade 12 is slightly tapered to provide opposite sides 15 converging toward the cutting edge 13 to provide tapered surfaces. As will be noted from an inspection of Figs. 2 and 3, the slot 11 is provided with one wall 16 inclined to mate with the tapered wall 14 of the cutter blade 12 and the inner end 17 of the cutter blade 12 is adapted to fit snugly in a groove 18 provided at the bottom of the slot 11 by a shoulder 19 which provides a surface 20 raised slightly above the bottom of groove 18. The opposite wall 21 of the slot 11 may be parallel to the wall 16 of such slot, or may be slightly inclined relative thereto for a purpose to be presently described. Substantially midway of the width of the cutter body 10 and communicating with the slot 11 is an annular bore 22 and this bore terminates as shown in Fig. 2, at substantially the same level as the upper surface 20 of the shoulder 19.

A locking wedge 23 is provided to be positioned between the side wall 15 of the cutter blade 12 and the wall 21 of the slot 11. The side wall 24 of the wedge 23 is provided with a taper opposite to that of the wall 15 of the cutter 11 and is designed to mate therewith. However, the temper of wall 24 is such that even though the wedge 23 may be tightly forced into the slot 11 to clamp the cutter blade 12 therein, the wedge 23 may still be easily moved outwardly to release the cutter blade 12. In other words, the taper provided on the wedge 23 is not what is commonly termed a sticky taper but is a relatively free taper. The wedge 23 is provided with a boss 25 projecting from the surface thereof opposite the tapered surface 24 and this boss 25 is located adjacent the lower edge of the wedge 23. Boss 25 is adapted to be slidably received in the annular bore 22 as best shown in Fig. 2, thus wedge 23 may move freely in and out of the slot 11 to clamp the cutter blade 12 in position therein or release the same and, of course, at the same time, boss 25 will freely slide in the annular bore 22.

In order to force the wedge 23 into firm engagement with the surface 15 of the cutter blade 12 to lock the cutter blade firmly in the cutter body 10, there may be provided a jack screw 26 threadedly received in a nut 27 which in turn is freely slidable in the bore 22. Nut 27 is held against rotation with relation to the body 10 and the wedge 23 by a flat surface 28 thereon which engages the rear surface of the wedge 23 and furthermore, it is to be noted that the boss 25 is provided with an inclined surface 29 merging into the rear surface of the wedge 23 and the nut 27 is provided with an inclined surface 30 which is complementary to the inclined surface 29. The purpose of these two inclined surfaces will be presently described. The screw 26 may be provided with a hexagonal recess 31 for the reception of a conventional Allen wrench which permits convenient rotation of the jack screw 26 by such wrench.

The bore 22 in the body 10 is provided with an annular groove 32 disposed slightly inwardly of the outer end of such bore 22. This groove 32 serves to receive a snap ring 33 which when seated therein prevents outward movement of the nut 27 beyond the position in engagement with the lower surface of snap ring 33.

In operation it is only necessary to position the cutter blade 12 in the slot 11 of body 10 and manipulate the jack screw 26 into engagement with the boss 25 until such time as the nut 27 engages the snap ring 33, whereupon further manipulation of the jack screw 26 will force the boss 25 and wedge 23 carried thereby, inwardly of the slot 11 to firmly engage the surface 15 of the cutter blade 12 and firmly lock the same in position against the wall 16 of slot 11. Relative rotation between the nut 27 and the wedge 23 will be prevented by the engagement of the flap 28 with the rear surface of the wedge 23 and when it is desired to remove the cutter blade 12 for sharpening or replacement, it is only necessary to actuate the jack screw 26 in the opposite direction, at which time, outward movement of the boss 25 and clamping wedge 23 will be permitted, whereupon the cutter blade 12 may be easily removed. The inclined surface 29 on the boss 25 provides sufficient strength to prevent breakage of the boss 25 and likewise the mating incline surface 30 on the nut 27 provides sufficient clearance to permit outward movement of the wedge 23 to a position where the cutter blade 12 may be easily removed. Obviously, the complete locking device of this invention may be conveniently removed from the cutter body 10 merely by removing the snap ring 33 from the annular groove 32, whereupon the jack screw 26, nut 27 and clamping wedge 23 may be removed from the body 10 for repair or for any other purpose.

It will be seen that by the above described invention there has been provided a relatively simple and easily manufactured locking device for removable cutter blades normally utilized in milling cutters or the like, which device serves to firmly clamp such cutter blade in place, but which in simple manual manipulation may permit removal of the blade for sharpening or replacement. The locking device of this invention may be conveniently incorporated in cutter bodies by a minimum of machining operations thereof, and it is to be noted that no threaded openings are necessary in such cutter bodies. No adjustments are necessary in order to provide accurate positioning of the cutter blade and it is only necessary to manipulate one jack screw in order to provide locking and unlocking of the cutter blade.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A rotary cutter comprising a body, a plurality of spaced slots in the periphery of said body, the opposite side walls of said slots being substantially parallel, a removable cutter blade disposed in each slot, a bore in said body adjacent each slot with the side wall of each bore opening into each slot, the longitudinal axis of each bore being substantially parallel to the adjacent side wall of each slot, a locking wedge disposed in each slot in engagement with said blade and the side wall of said slot adjacent said bore, a boss on said wedge slidably disposed in said bore, a nut slidably disposed in said bore, a jack screw threadedly received in said nut, a flat surface on said nut engaging the adjacent surface of said wedge to prevent rotation of said nut in said bore, an annular groove in the wall of said bore adjacent the outer end thereof and a removable snap ring disposed in said groove to limit outward movement of said nut whereby upon actuation of said jack screw into engagement with said boss said wedge will be forced into tight engagement with said blade to lock the same in place, reverse movement of said jack screw releasing said wedge and permitting removal of said blade.

2. A rotary cutter comprising a body, a plurality of spaced slots in the periphery of said body, a removable cutter blade disposed in each slot, a bore in said body adjacent each slot with the side wall of each bore opening into each slot, the longitudinal axis of each bore being substantially parallel to the adjacent side wall of each slot, a locking wedge disposed in each slot in engagement with said blade and the side wall of said slot adjacent said bore, a boss on said wedge slidably disposed in said bore, a nut slidably disposed in said bore, a jack screw threadedly received in said nut, means to prevent rotation of said nut in said bore, an annular groove in the wall of said bore adjacent the outer end thereof and a removable ring disposed in said groove to limit outward movement of said nut whereby upon actuation of said jack screw into engagement with said boss said wedge will be forced into tight engagement with said blade to lock the same in place, reverse movement of said jack screw releasing said wedge and permitting removal of said blade.

3. A rotary cutter comprising a body, a plurality of spaced slots in the periphery of said body, a removable cutter blade disposed in each slot, a bore in said body adjacent each slot, the longitudinal axis of each bore being substantially parallel to the adjacent side wall of each slot, a locking wedge disposed in each slot in engagement with said blade and the side wall of said slot adjacent said bore, a boss on said wedge slidably disposed in said bore, a nut slidably disposed in said bore outwardly of said boss, a jack screw threadedly received in said nut, means to prevent rotation of said nut in said bore, and means to limit outward movement of said nut whereby upon actuation of said jack screw into engagement with said boss said wedge will be forced into tight engagement with said blade to lock the same in place, reverse movement of said jack screw releasing said wedge and permitting removal of said blade.

References Cited in the file of this patent

UNITED STATES PATENTS

| Number | Name | Date |
|---|---|---|
| Re. 21,068 | Miller | May 2, 1939 |
| 895,219 | Whittemore et al. | Aug. 4, 1908 |
| 1,420,171 | Wille | June 20, 1922 |
| 1,549,634 | Vokal | Aug. 11, 1925 |
| 2,037,642 | Schribner | Apr. 14, 1936 |
| 2,178,589 | Kraus | Nov. 7, 1939 |
| 2,229,112 | Miller et al. | Jan. 21, 1941 |
| 2,245,446 | Sheldrick | June 10, 1941 |
| 2,257,169 | Hopps | Sept. 30, 1941 |
| 2,331,555 | Jostich | Oct. 12, 1943 |
| 2,435,287 | Miller | Feb. 3, 1948 |
| 2,547,789 | Skeel | Apr. 3, 1951 |
| 2,567,167 | Drader | Sept. 11, 1951 |
| 2,583,309 | Sloderbeck et al. | Jan. 22, 1952 |

FOREIGN PATENTS

| Number | Country | Date |
|---|---|---|
| 626,812 | Great Britain | July 21, 1949 |
| 695,089 | Great Britain | Aug. 5, 1953 |